United States Patent
Deprun

(10) Patent No.: US 9,325,510 B2
(45) Date of Patent: Apr. 26, 2016

(54) METHOD AND DEVICE FOR CONTROLLING AD-HOC NETWORK IN CPNS ENABLER

(75) Inventor: Jean-Francois Deprun, Paris (FR)

(73) Assignee: LG Electronics Inc., Seoul (KR)

( * ) Notice: Subject to any disclaimer, the term of this patent is extended or adjusted under 35 U.S.C. 154(b) by 267 days.

(21) Appl. No.: 13/376,305

(22) PCT Filed: Jun. 17, 2010

(86) PCT No.: PCT/KR2010/003917
§ 371 (c)(1),
(2), (4) Date: Dec. 14, 2011

(87) PCT Pub. No.: WO2011/007963
PCT Pub. Date: Jan. 20, 2011

(65) Prior Publication Data
US 2012/0102161 A1    Apr. 26, 2012

Related U.S. Application Data

(60) Provisional application No. 61/225,176, filed on Jul. 13, 2009.

(51) Int. Cl.
*G06F 15/177* (2006.01)
*H04L 12/12* (2006.01)
(Continued)

(52) U.S. Cl.
CPC .......... *H04L 12/12* (2013.01); *H04L 12/40013* (2013.01); *H04W 84/20* (2013.01)

(58) Field of Classification Search
CPC ..... H04W 84/18; H04W 84/20; H04W 28/18; H04W 48/16
USPC .......................................................... 709/220
See application file for complete search history.

(56) References Cited

U.S. PATENT DOCUMENTS 6,760,418 B1 * 7/2004 Abbasi et al. ............ 379/115.01
7,177,910 B1 * 2/2007 Bell .............................. 709/208
(Continued)

FOREIGN PATENT DOCUMENTS

WO    WO 2010050643 A1 *  5/2010    .............. H04L 29/08

OTHER PUBLICATIONS

Hasan et al., "Femtocell versus WiFi—A Survey and Comparison of Architecture and Performance," IEEE, Wireless VITAE 2009, May 17, 2009, pp. 916-920.
(Continued)

*Primary Examiner* — Brian J Gillis
*Assistant Examiner* — Shean Tokuta
(74) *Attorney, Agent, or Firm* — Birch, Stewart, Kolasch & Birch, LLP

(57) ABSTRACT

A method and device for controlling an ad-hoc network using a CPNS entity having a secure element (SE) in a CPNS enabler are discussed. According to an embodiment, the invention provides a method including receiving ad-hoc network information and SE information from each of the CPNS entities; designating one of the CPNS entities to be an ad-hoc network controller for an ad-hoc network based on the ad-hoc network information and the SE information; transmitting a command to perform a configuration of the ad-hoc network, information about the designated ad-hoc network controller, and service constraint information, to the designated ad-hoc network controller; and receiving service use information prepared based on the service provided in the ad-hoc network from the designated ad-hoc network controller.

8 Claims, 5 Drawing Sheets

(51) Int. Cl.
    *H04L 12/40*     (2006.01)
    *H04W 84/20*     (2009.01)

(56) References Cited

U.S. PATENT DOCUMENTS

| | | | | |
|---|---|---|---|---|
| 7,272,635 | B1* | 9/2007 | Longtin et al. | 709/208 |
| 2001/0052020 | A1* | 12/2001 | Brodie et al. | 709/232 |
| 2002/0147926 | A1* | 10/2002 | Pecen et al. | 713/201 |
| 2004/0180648 | A1* | 9/2004 | Hymel et al. | 455/418 |
| 2004/0196872 | A1* | 10/2004 | Nakamura | 370/512 |
| 2004/0204087 | A1* | 10/2004 | Carlsson | 455/558 |
| 2005/0086273 | A1* | 4/2005 | Loebbert et al. | 707/204 |
| 2005/0122944 | A1* | 6/2005 | Kwon et al. | 370/338 |
| 2006/0029007 | A1* | 2/2006 | Ayyagari | 370/310 |
| 2006/0159123 | A1* | 7/2006 | Fleury et al. | 370/468 |
| 2006/0179084 | A1* | 8/2006 | Thomas et al. | 707/204 |
| 2006/0206601 | A1* | 9/2006 | Shvodian | 709/223 |
| 2006/0215611 | A1* | 9/2006 | Nakagawa et al. | 370/332 |
| 2006/0218632 | A1* | 9/2006 | Corley et al. | 726/12 |
| 2006/0233142 | A1* | 10/2006 | Iwamura | 370/338 |
| 2009/0172825 | A1* | 7/2009 | Yi et al. | 726/33 |
| 2009/0185523 | A1* | 7/2009 | Allen et al. | 370/328 |
| 2010/0034125 | A1* | 2/2010 | Ralston | 370/310 |
| 2010/0049846 | A1* | 2/2010 | Ballette et al. | 709/224 |
| 2010/0229229 | A1* | 9/2010 | Kumar et al. | 726/7 |
| 2010/0284390 | A1 | 11/2010 | Lee et al. | |
| 2011/0149802 | A1* | 6/2011 | Fok Ah Chuen et al. | 370/254 |

OTHER PUBLICATIONS

Ishikawa et al., "Recent Activities in PUCC and Its Application to Integrated Home Network Control and Management," IEEE CCNC, Jan. 9, 2010, 5 pages total.

Park et al., "OPeN (Overlaid Personal Network)—A Novel Approach of Sharing Personal Resources," ICACT 2009, Feb. 15-18, 2009, pp. 883-886.

* cited by examiner

Other servers | CPNS Servers | CPNS Gateways | PNEs | Other devices other servers | CPNS servers | GWs | PNE/Device Ad-Hoc Network

METHOD AND DEVICE FOR CONTROLLING AD-HOC NETWORK IN CPNS ENABLER

This application is the National Phase of PCT/KR2010/003917 filed on Jun. 17, 2010, which claims priority under 35 U.S.C. 119(e) to U.S. Provisional Application No. 61/225,176 filed on Jul. 13, 2009, all of which are hereby expressly incorporated by reference into the present application.

TECHNICAL FIELD

The present invention relates to controlling an ad-hoc network in a Converged Personal Network Service (CPNS) enabler.

BACKGROUND ART

Among various technologies being developed, Converged Personal Network Service (CPNS) is a service that allows devices in one Personal Network (PN) to access services outside that PN, e.g., another PN or other network. Generally the CPNS is implemented by a CPNS enabler which can include a CPNS server, one or more Gateways (GWs), and one or more PNEs (Personal Network Elements). A PN GW (or CPNS GW) connects one PN to network, e.g., using a mobile communication network. A PNE is a basic component that makes up a PN, and can be a single device or a group of devices. These components and general operations of the CPNS are also discussed in Open Mobile Alliance (OMA) telecommunications standards documents.

FIG. 1 illustrates an example of a CPNS enabler according to a related art. As shown in FIG. 1, a CPNS server can communicate and exchange data with one or more PN gateways, each of which in turn can communicate and exchange data with one or more PNEs in a PAN (Personal Area Network).

Each of the PNEs can communicate and exchange data with the PN gateways, other devices or PNEs in other networks, etc. Each of the PN gateways can communicate and exchange data with the CPNS servers, other PN gateways, PNEs, etc. Each CPNS server can also communicate with other servers, gateways, etc. For instance, the CPNS server and the PN gateway (e.g., mobile phone) can communicate with each other through a cellular network, while the PN gateway can communicate with the PNEs through the WPAN such as Bluetooth, NFC, Zigbee, Wi-Fi, etc. Generally communications between the CPNS servers, gateways, and PNEs are carried out using known networks and techniques, e.g., Bluetooth, 802.11, Wi-Fi, WPAN (Wireless Personal Area Network), cellular networks such as 3GPP, etc.

The CPNS server generally manages and controls communications among the PN gateways and PNEs so that applications and information among these units of the CPNS enabler may be shared with each other as needed to enhance the user experience. For instance, in FIG. 1, according to the CPNS service of the CPNS enabler, a user at one PNE (e.g., Portable Multimedia Player—PMP) can view GPS (Global Positioning System) information which is received from another PNE (e.g., GPS device) through a PN gateway (e.g., cellular phone). As a result, the user can have access to a more variety of services that are offered within the user's current PAN as well as outside the PAN.

Although the CPNS enabler according to the related art provides various advantageous services, improvements on the CPNS enabler can be further made to provide enhanced CPNS services.

DISCLOSURE OF INVENTION

Solution to Problem

The present invention provides an enhanced CPNS service by controlling an ad-hoc network in a CPNS enabler.

The present invention allows a method and device for controlling an ad-hoc network in a CPNS enabler, which address the limitations and disadvantages associated with the related art.

The present invention provides the use of a secure element (SE) (e.g. SIM, SD card with secure feature . . . ) associated with a CPNS device, which can function as an ad-hoc network controlling node on behalf of a CPNS server, to control and manage the ad-hoc network in a CPNS enabler.

The present invention allows communications between a CPNS device having a SE (functioning as an ad-hoc network controlling node) and an external server (e.g., network operator's server), whereby the external server can access and manage information associated with the ad-hoc network.

According to one aspect, the present invention provides a method for controlling an ad-hoc network in a converged personal network service (CPNS) enabler, the CPNS enabler including a CPNS server and a plurality of CPNS entities, at least one of the CPNS entities including a secure element (SE), the method comprising: receiving, by the CPNS server, ad-hoc network information and SE information from each of the CPNS entities; designating, by the CPNS server, a certain one of the CPNS entities to be an ad-hoc network controller for an ad-hoc network based on the ad-hoc network information and the SE information; transmitting, by the CPNS server, a command to perform a configuration of the ad-hoc network, information about the designated ad-hoc network controller, and service constraint information, to the designated ad-hoc network controller, the service constraint information being used by the designated ad-hoc network controller to manage at least one service provided in the ad-hoc network; and receiving, by the CPNS server, service use information prepared based on the at least one service provided in the ad-hoc network from the designated ad-hoc network controller.

According to another aspect, the present invention provides a server device for controlling an ad-hoc network in a converged personal network service (CPNS) enabler, the CPNS enabler including the server device and a plurality of CPNS entities, the server device being a CPNS server or an ad-hoc server, at least one of the CPNS entities including a secure element (SE), the server device comprising: a receiver/transmitter unit; and a controller cooperating with the receiver/transmitter unit and configured to: receive ad-hoc network information and SE information from each of the CPNS entities; designate a certain one of the CPNS entities to be an ad-hoc network controller for an ad-hoc network based on the ad-hoc network information and the SE information; transmit a command to perform a configuration of the ad-hoc network, information about the designated ad-hoc network controller, and service constraint information, to the designated ad-hoc network controller, the service constraint information being used by the designated ad-hoc network controller to manage at least one service provided in the ad-hoc network; and receive service use information prepared based on the at least one service provided in the ad-hoc network from the designated ad-hoc network controller.

According to another aspect, the present invention provides a mobile terminal for controlling an ad-hoc network in a converged personal network service (CPNS) enabler, the CPNS enabler including a CPNS server and a plurality of CPNS entities, the mobile terminal being one of the CPNS entities, the mobile terminal comprising: a receiver/transmitter unit; a secure element (SE); and a controller cooperating with the receiver/transmitter unit and the SE and configured to: transmit ad-hoc network information and SE information of the mobile terminal to the CPNS server; receive a notification that the mobile terminal is a designated ad-hoc network master node for an ad-hoc network, from the CPNS server; receive a command to perform a configuration of the ad-hoc network, and service constraint information, from the CPNS server; store, in the SE, the service constraint information; mange at least one service provided in the ad-hoc network based on the service constraint information stored in the SE; and transmit service use information prepared based on the at least one service provided in the ad-hoc network, to the CPNS server.

These and other features of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention and wherein.

MODE FOR THE INVENTION

Figure 1:
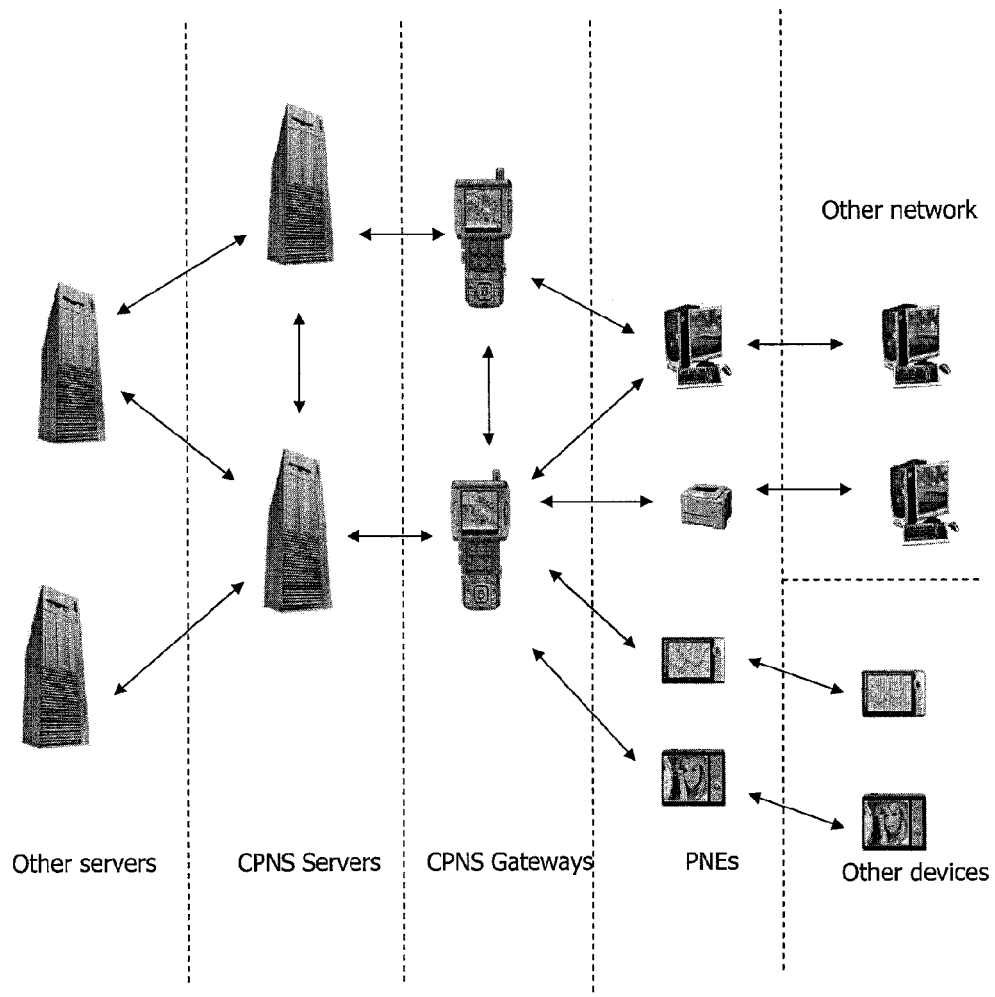
FIG. 1 is a diagram of a CPNS enabler according to a related art.

Hereinafter, exemplary embodiments of the invention will be described in detail with reference to the attached drawings. The embodiments described below are intended to exemplify the technical spirit of the invention, but are not intended to limit the scope of the invention.

According to embodiments of the invention, a CPNS enabler preferably includes at least one CPNS server and a plurality of CPNS entities. The CPNS server and CPNS entities are also referred to herein as the units of the CPNS enabler or CPNS units. Each of the CPNS units can include various components, which can include at least one of a receiver/transmitter, a storage/memory, a processor/controller, etc. The CPNS server controls the operations of the CPNS enabler and stores policy information and/or user preference information associated with each or some of the units of the CPNS enabler. The CPNS entity can be a CPNS gateway (or PN gateway) or PNE (or Device coupled to the PNE). Some examples of the PNEs can be a handset or mobile terminal, GPS, navigation device, MP3 player, audio/video player, PMP (Portable Multimedia Player), handset with GPS, PC (Personal Computer), desktop, computer notebook, printer, computer tablet, scanner, TV, set top box, etc. Some examples of the PN gateways can be a mobile terminal or handset, home gateway, smart phone, set top box, desktop, TV, computer notebook, etc.

In the present invention, an ad-hoc network within the CPNS enabler is created where a CPNS entity having a SE is designated as an ad-hoc network master node (ad-hoc network controller) for controlling the ad-hoc network operations. This designation is preferably done by the CPNS server based on ad-hoc network information (e.g., ad-hoc capability) and SE information (e.g., whether or not a SE exists) from each of the CPNS entities. In the CPNS enabler, generally the ad-hoc features (e.g., ad-hoc network operations, etc.) can be managed by the CPNS server or by another specific server which is referred to herein as an ad-hoc server. The CPNS server or ad-hoc server can designate another entity as the ad-hoc network master node according to the invention.

An ad-hoc network is a network of connected PNE(s) where the PNE(s) form an Overlay Network, the process of establishing and maintaining connectivity between the PNE(s) is handled mainly by the PNE(s) themselves, and the PNE(s) can both offer and receive services. The Overlay Network is a virtual network which is built on top of an existing underlying network. Nodes in the Overlay Network can reach each other through multiple physical or logical links in the underlying network. For instance, an ad-hoc network composed of one GW and two PNEs may be formed within the CPNS enabler. The GW and PNEs in that ad-hoc network can communicate with each other. One or more different ad-hoc networks may be formed within the CPNS enabler, and may be variably set (or removed) as needed.

According to the invention, when setting up the ad-hoc network, the CPNS device having the SE, which is designated as the ad-hoc network master node, can store all information associated with the ad-hoc network therein, which can be communicated to the CPNS server and/or any external server. The SE is preferably a SIM (Subscriber Identity Module) card, an external/removable card such as a SD (Secure Digital) card, or an internal card. These cards can be in other form/shape such as they can be tokens, sticks, etc. The SE may also be a multimedia card (MMC), a memory stick, a USB dongle, etc. Further, absent the CPNS server connection, the designated CPNS device having the SE can still manage and carry out the ad-hoc network operations, instead of the CPNS server, and subsequently, if the CPNS server connection is re-established, the ad-hoc network operation information stored in the SE can be uploaded to the CPNS server (or any other device such as an external server). As a result, the invention allows continual and efficient management of the ad-hoc operation by using the SE of the CPNS device designated as the ad-hoc network master node.

Figure 2:
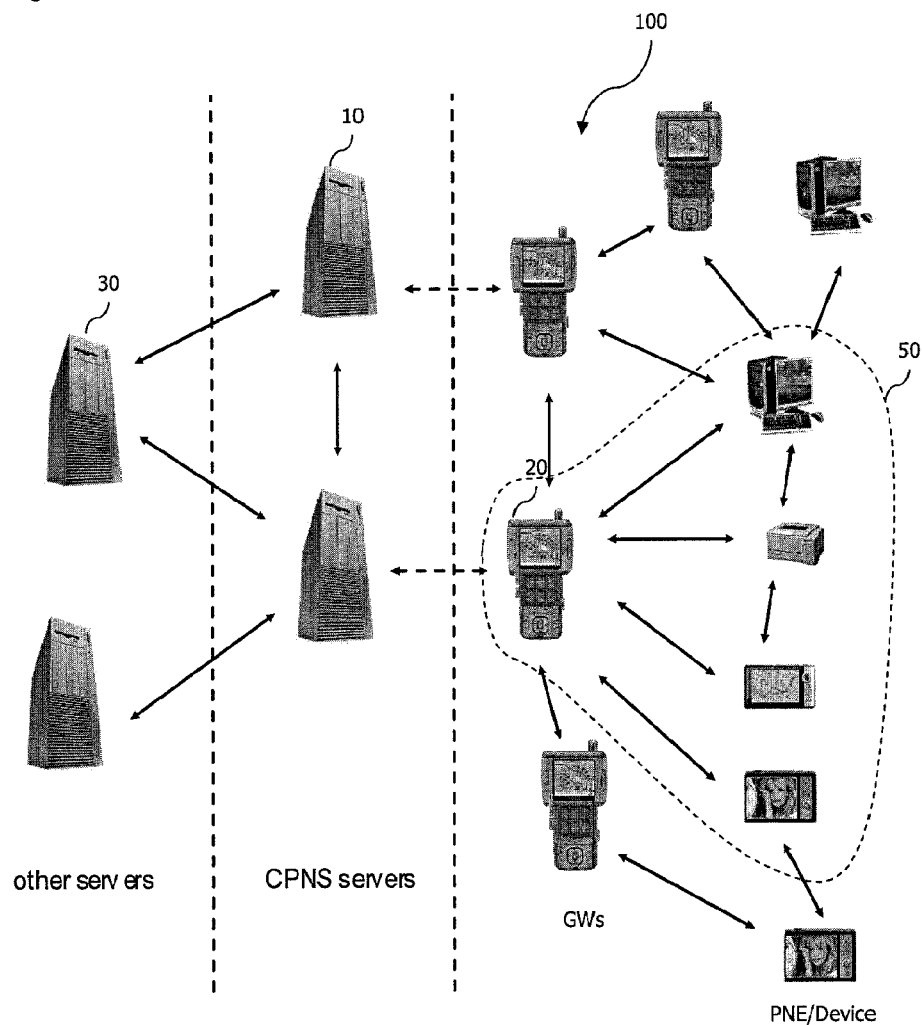
FIG. 2 is a diagram of an ad-hoc network in a CPNS enabler according to an embodiment of the invention.

FIG. 2 is a diagram of an example of a CPNS enabler 100 having an ad-hoc network 50 according to an embodiment of the invention. As shown in FIG. 2, the CPNS enabler 100 can include one or more CPNS servers 10, one or more gateways GW, and a plurality of PNEs and/or Devices. The CPNS server(s) 10 controls the CPNS entities (e.g., GWs, PNEs, Devices, etc.), and each can include a signal receiving/transmitting unit, a memory or storage, a process/controller for controlling the operations of the CPNS server and others, etc. All the units of the CPNS enabler 100 are operatively coupled and configured, and communicate amongst each other as configured using known networks and techniques, e.g., Bluetooth, 802.11, Wi-Fi, WPAN (Wireless Personal Area Network), cellular networks such as 3GPP, etc. Further, a gateway can become and function as a PNE and vice versa. The Devices of the CPNS enabler 100 can also be PNEs or devices coupled to the PNEs.

For each CPNS entity (e.g., gateway, PNE, or Device) of the CPNS enabler 100, the CPNS server 10 preferably stores static information and/or dynamic information as applicable. The CPNS server 10 can also store static and/or dynamic information about itself. Static information is information that is fixed or changes rarely, whereas the dynamic information is information that changes regularly, in real time, or as needed. Further, the CPNS server 10 can communicate with one or more external servers 30 such as operator's servers, etc. and exchange information as needed.

In the example of FIG. 2, an ad-hoc network 50 composed of a GW 20 and other CPNS entities is formed. Prior to this formation, the CPNS server 10 designates the GW 20 as an ad-hoc network controller (ad-hoc network master node) for this ad-hoc network 50 since the GW 20 has a SE therein. A method for designating an ad-hoc network master node and forming and managing an ad-hoc network will be discussed later in more detail referring to FIG. 5.

Once the GW 20 is designated to be the ad-hoc master node, the GW 20 configures the components of the ad-hoc network so that all communications may pass through the master node. For instance, FIGS. 3 and 4 are diagrams illustrating an example of configuring an ad-hoc network by a GW in a CPNS enabler according to an embodiment of the invention.

Figure 3:
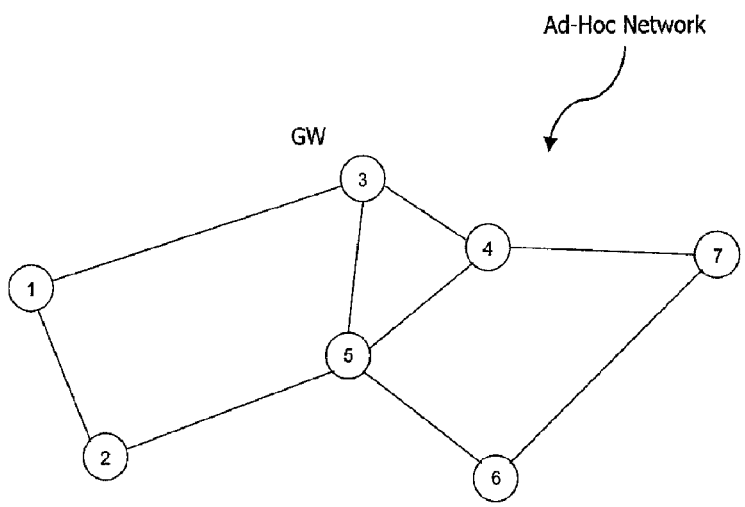
FIGS. 3 and 4 are diagrams illustrating an example of configuring an ad-hoc network by a CPNS gateway (GW) in a CPNS enabler according to an embodiment of the invention.
Figure 4:
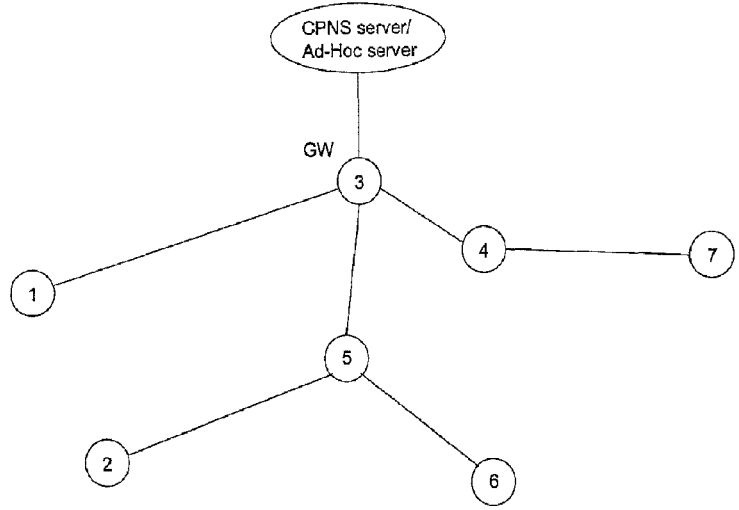

Particularly, FIG. 3 shows an example of an ad-hoc network in a CPNS enabler. As shown in FIG. 3, a GW (#3) has a Secure Element (e.g., a SIM card or SD card). Once the CPNS server or ad-hoc server designates the GW (#3) as the ad-hoc network master node, the GW (#3) will optimize the paths of the ad-hoc network to become a critical node as shown in FIG. 4. To do this, the GW (#3) sends messages of ad-hoc network configuration to all ad-hoc network entities to modify the topology of the ad-hoc network. For instance, such messages may indicate to each ad-hoc network entity that the GW (#3) is the critical node and to send its communication to the GW (#3). As a result, the communications of the ad-hoc network passes through the GW (#3). The GW (#3) can also update information within each of the ad-hoc network entities. In this regard, the method of FIG. 5 may be used.

Figure 5:
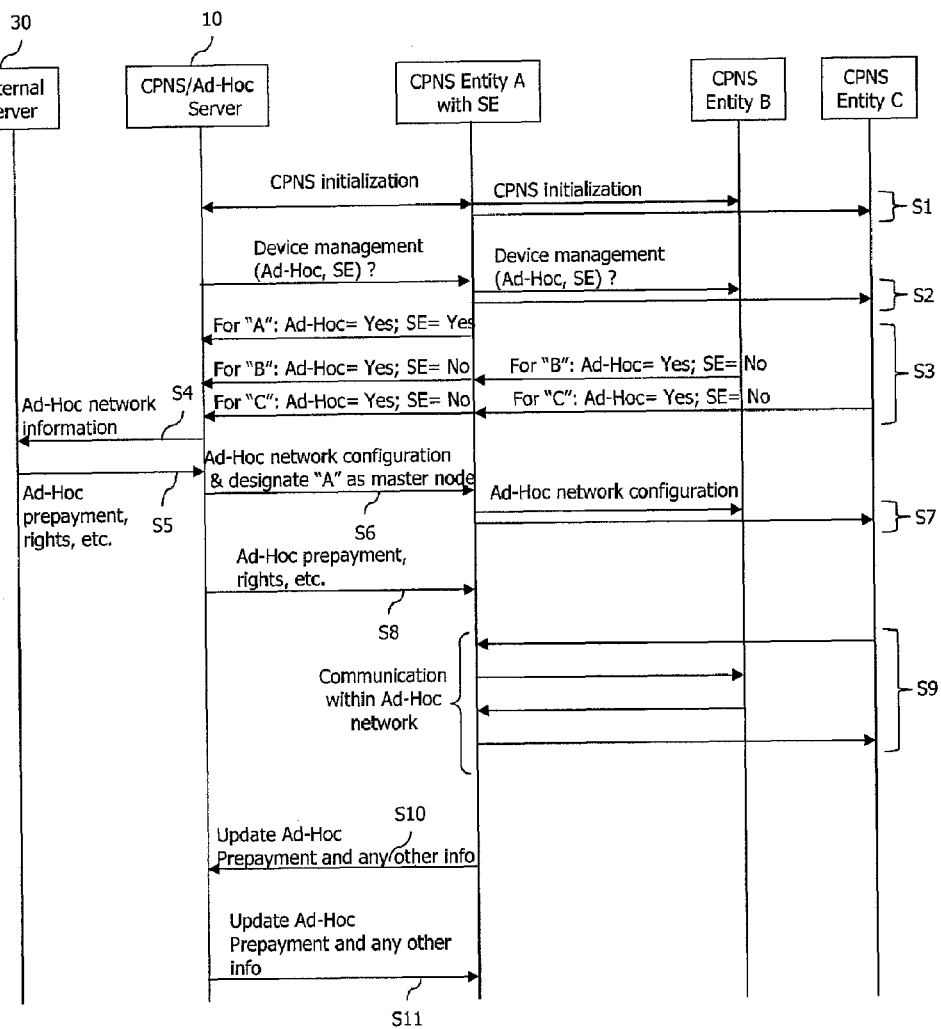
FIG. 5 is a flowchart illustrating a method of controlling an ad-hoc network in a CPNS enabler using a secure element (SE) according to an embodiment of the invention.

FIG. 5 is a flowchart illustrating a method of controlling an ad-hoc network in a CPNS enabler using a secure element (SE) according to an embodiment of the invention. The method of FIG. 5 can be implemented in any CPNS enabler, e.g., the CPNS enablers of FIGS. 2-4.

In the example of FIG. 5, a CPNS enabler includes a CPNS server 10 and CPNS entities A, B and C. The component 10 can also represent an ad-hoc server, instead of the CPNS server. For the sake of brevity, reference to the CPNS server 10 here means the component can be a CPNS server or an ad-hoc server. The CPNS server 10 can communicate with an external server 30 such as operator's server in an operator's network for, e.g., managing the charges, payments, rights, user, etc. In this example, each of the CPNS entities A, B and C has an ad-hoc feature, e.g., capability of communicating via an ad-hoc network. The CPNS entity A has a SE while the CPNS entities B and C do not have a SE. For instance, the CPNS entity A can be a gateway, and can be a mobile terminal or handset which can include a receiving/transmitting unit, a storage unit, a SE, a processor/controller for controlling the mobile terminal, a display unit, an input unit, etc. In an example, the CPNS entity A and the ad-hoc server may be in one device such as a handset or mobile terminal.

Referring to FIG. 5, at the CPNS discovery and initialization, the CPNS server 10 communicates with the CPNS entities A, B and C to determine CPNS entities that are involved and their characteristics at step S1.

At step S2, the CPNS server 10 asks each of the CPNS entities A, B and C if it has an Ad-hoc feature and if it has a Secure Element (SE) associated with it, e.g., a SIM card, a SD card, etc.

At step S3, each of the CPNS entities A, B an C responds to the CPNS server 10's inquiry/request and provides a response thereto to the CPNS server 10. In this example, the CPNS entities A, B and C all have the Ad-hoc feature while only the CPNS entity A has the SE. Thus, the CPNS server 10 can determine that an ad-hoc network composed of the CPNS entities A, B and C may be formed since all the CPNS entities A, B and C have the Ad-hoc feature. Further, the CPNS server 10 selects that the CPNS entity A should be the ad-hoc network's master node for controlling this ad-hoc network since the CPNS entity A has the SE. Steps S2 and S3 are for ad-hoc discovery.

At step S4, the CPNS server 10 informs the external server 30 about the ad-hoc network to be formed which is composed of the CPNS entities A, B and C and that the entity A will be the designated master node. In this regard, the CPNS server 10 can provide any information associated with the ad-hoc network or upon request by the external server 30, to the external server 30 or another entity. For instance, the CPNS server 10 may notify the external server 30 (e.g., charging server) about information on the members of the ad-hoc network about to be formed.

At step S5, the external server 30 can provide ad-hoc prepayment information for any member of the ad-hoc network and rights information for any member of the ad-hoc network, to the CPNS server 10. The ad-hoc prepayment information may indicate a pre-set pre-paid amount of service/time that a particular member (CPNS entity) of this ad-hoc network to be formed has. The rights information may indicate if a particular member of the ad-hoc network may have right(s)/limitations to access, transmit, copy, reproduce, etc. a CPNS service or any operation within the ad-hoc network.

At step S6, the CPNS server 10 notifies the CPNS entity A that the CPNS entity A will be this ad-hoc network's master node and provides parameters/information/data for configuring the ad-hoc network. The CPNS server 10 assists the CPNS entity A (master node) with the ad-hoc network configuration. For instance, at step S8, the CPNS server 10 downloads into the SE of the CPNS entity A certain information about the ad-hoc network for the ad-hoc network configuration. The CPNS server 10 may have received some of this information from the external server 30. The information (e.g., server constraint information, etc.), which is downloaded or stored into the SE of the CPNS entity A under control of the CPNS server 10, can preferably include, but is not limited to, one or more of the following:

Information on ad-hoc actors (e.g., identification of the CPNS entities A, B and C, etc.);
Information on each ad-hoc actor's features (e.g., capabilities, capacities, etc.), which can be an example of the service constraint information;
Information on each ad-hoc actor's rights and billings (e.g., prepayment information, right information, etc.), which can be another example of the service constraint information; and/or
Information on ad-hoc limitations (e.g., time for the ad-hoc network, quantity of data allowed in the ad-hoc network, specific features allowed within the ad-hoc network, etc.), which can be another example of the service constraint information.

The prepayment information may indicate at least one of the following: a duration of a service allowed in the ad-hoc network; a data size of a service allowed in the ad-hoc network; and a number of messages allowed for a service in the ad-hoc network. The rights information may indicate whether or not each of the CPNS entities has an access to a service provided in the ad-hoc network.

At step S7, the CPNS entity A then configures the ad-hoc network based on the information received from the CPNS server 10. The CPNS entity A also provides any information needed to the CPNS entities B and C, to configure the ad-hoc network, whereby the ad-hoc network composed of the entities A, B and C is formed. A conventional method of forming an ad-hoc network may be used. However, according to the invention, the CPNS entity A with the SE is now designated as the ad-hoc network master mode. Further the CPNS entities B and C are notified to send all communications pertaining to the ad-hoc network to the CPNS entity A. As such, the CPNS entity A becomes the master node in the formed ad-hoc network. All the ad-hoc communication will pass through this master node since the CPNS entity A (or the CPNS server 10) has configured the connections with the members of the ad-hoc network so that this can be realized (e.g., see the example of FIG. 4). Steps S6-S8 are the steps for creating the ad-hoc network and may be performed in any order, e.g., steps S6, S8 and then S7; step S6, S7 and then S8; or steps S6 and S8 at the same time and then S7.

At step S9, the ad-hoc network then can be used by the members. Any communication within the ad-hoc network (entities A, B and C) passes through the master node (entity A). For instance, a message from the CPNS entity C to B passes through the entity A having the SE. A response message from the CPNS entity B to C passes through the entity A. In this way, the entity A can have information about all communications and activities within the ad-hoc network, which can then be stored in the SE of the entity A, which in turn can be provided to the CPNS server 10 and/or the external server 30. For instance, the ad-hoc master node (CPNS entity A with the SE) stores and updates its SE with any information as needed (e.g., billing, quantity of data passed, type of data passed, use of rights, active members, limitations, etc.). The information stored in the SE of the CPNS entity A can be updated in real time, regularly, at certain intervals, at the time of activity, etc.

At step S10, the information pertaining the ad-hoc network (e.g., use of the ad-hoc network, updated prepayment information, rights use information, amount of data passed, updated ad-hoc network member information, etc.) as stored/updated in the SE of the CPNS entity A (master node) is then sent to the CPNS server 10. This information may be referred to as service use information (e.g., updated prepayment information, updated rights information, etc.). The provision of this information from the CPNS entity A to the CPNS server 10 can occur using known data synchronization techniques. This synchronization between the SE of the master node and the CPNS server 10 can be done in real time so that the CPNS server 10 can also have therein the current information that is also stored in the SE of the master node.

Further, if the connection between the ad-hoc network master node (entity A) and the CPNS server 10 is broken for any reason, all the ad-hoc network information is saved in the SE of the master node and thus is not lost. Further, when the connection between the ad-hoc network master mode (entity A) and the CPNS server is broken, the ad-hoc network master node can allow communication in the ad-hoc network in function of information saved by the CPNS server in the SE of the master node. For example, the CPNS server may save information for use during this disconnection state into the SE of the master node. When the disconnection state occurs (connection between the CPNS server and the master node is broken), then the information stored in the SE can be used for the continual use of the ad-hoc network, e.g., communication will be allowed during 5 minutes, during a complete game, a quantity of data, etc. Then as soon as the connection between the CPNS server 10 with the master node is restored, the ad-hoc master node (entity A) can synchronize its SE with the CPNS server so that the CPNS server 10 can have the updated information regarding the ad-hoc network and its operations from the SE of the master node.

At step S11, the CPNS server 10 can update the information stored in the SE of the master node (entity A) as needed. For instance, such updating may occur whenever or as needed once the ad-hoc network is formed. The information such as the prepayment information may be updated in the SE of the master node by the CPNS server 10. For instance, if the prepayment amount may be increased (e.g., when a user at the entity C requests it to the charging server 30), then the CPNS server 10 can download this updated prepayment information into the SE of the master node (entity A). The CPNS server 10 can obtain this updated information from the external server 30.

Figure 6:
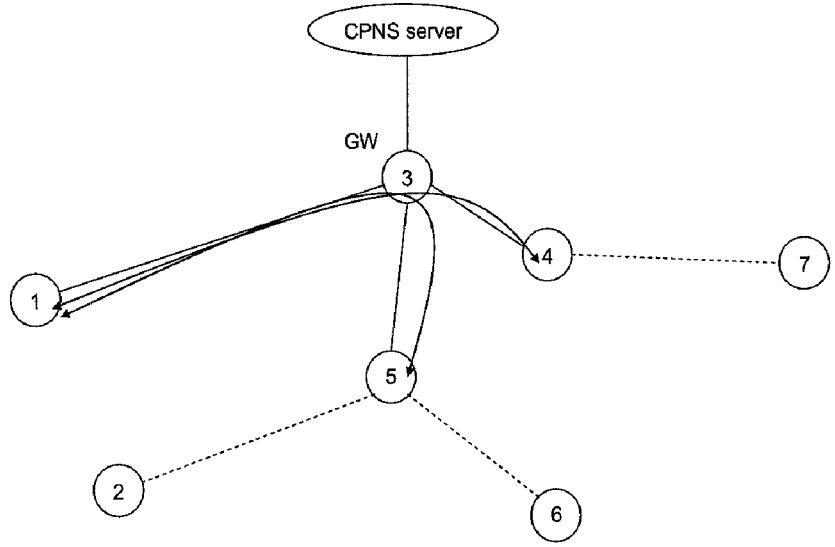
FIGS. 6 to 8 are diagrams illustrating an example of controlling and operating an ad-hoc network using a gateway with a SE in a CPNS enabler according to an embodiment of the invention.
Figure 7:
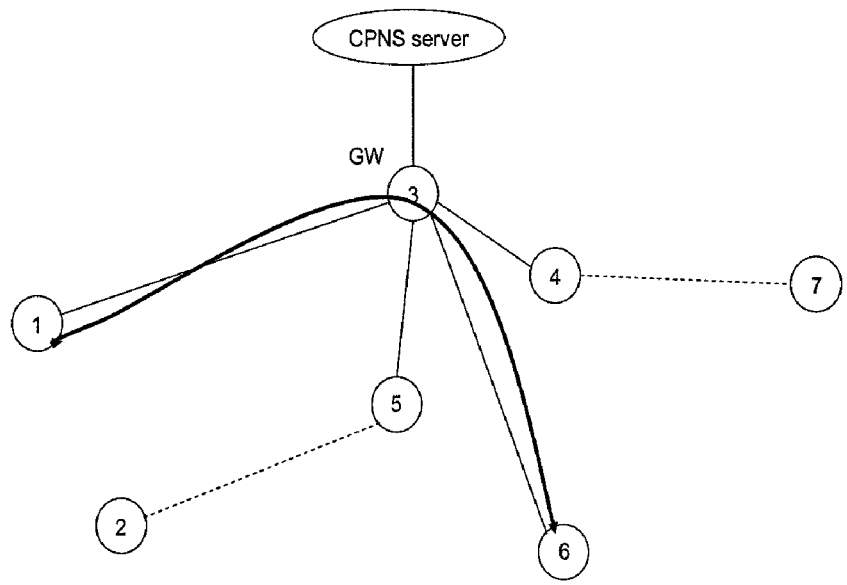
Figure 8:
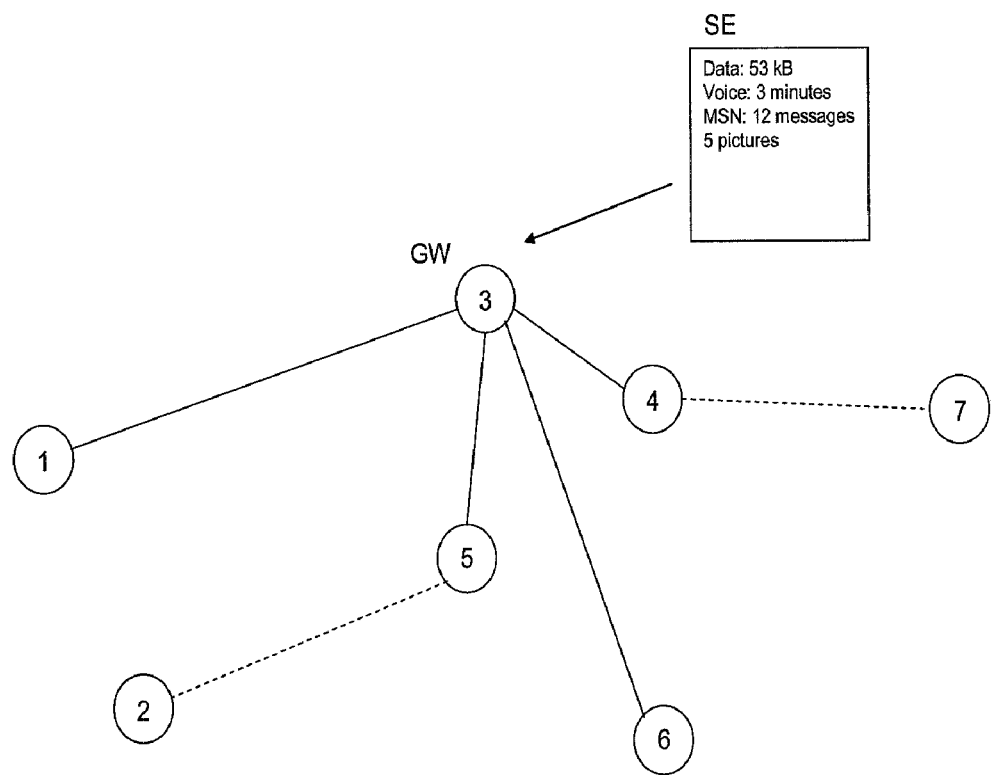

FIGS. 6 to 8 are diagrams illustrating an example of controlling and operating an ad-hoc network using a gateway with a SE in a CPNS enabler according to an embodiment of the invention.

More specifically, an ad-hoc network is shown in FIG. 6 where the gateway #3 is the designated ad-hoc network master node according to the methods of the invention. As such, the gateway #3 controls the communications between the members of the ad-hoc network, namely, the CPNS entities #1, #3 #4, #5. All the information of these nodes and entities will be saved in the SE or controlled by the SE of the gateway #3 (master node). In this example, the CPNS entities #6, #2 and #7 can be used or can participate in the ad-hoc network operations for no payment features (e.g., features that do not require payment). However, if the CPNS entity #6 desires to use a payment feature (e.g., feature that requires payment by the entity #6), a request from the CPNS entity #6 is sent to the master node (entity #3), which then reconfigures the ad-hoc network if it is possible as shown in the example of FIG. 7.

As such in FIG. 7, the master node (entity #3) can directly control the CPNS entity #6 regarding any ad-hoc operations including the use of the payment features, and can update such use information in the SE of the master node (entity #3), which then can be provided to the CPNS server 10 as discussed above.

For instance, as shown in FIG. 8, the SE in the master node (entity #3) has the prepayment information stored therein, which can be updated in the SE. When there are communications between the ad hoc nodes (members of the ad-hoc network), the master node (entity #3) manages such communications and updates the information associated thereto into the SE of the master node. In the example of FIG. 8, the SE of the master node (entity #3) can save or store the service constraint information which indicates services/operations allowed within the ad-hoc network. Below is an example of such service constraint information for the ad-hoc network (or for one of its sessions):

Data: 5 KB
Voice: 3 minutes
MSN: 12 messages
5 pictures.

According to the above service constraint information, any communication in this ad-hoc network needs to have a data size less than or equal to 5 KB, any voice communication needs to be less than or equal to 3 minutes, and 12 MSN messages and 5 pictures are allowed to be communicated. Thus, for instance, when a user at the CPNS entity #4 sends a MSN message to the entity #3, the master node (entity #3) allows this action and updates its information in the SE to reflect this action. For instance, the SE of the entity #3 stores that MSN: 12 messages→11 messages, wherein the number of messages allowed is decreased according to the use. In this example, we MSN=0 Message, the master node (entity #3) then can ban or prohibit the transmission of any more MSN messages within the ad-hoc network.

Further, the information stored in the SE of the master node #3 is synchronized with the CPNS server 10 so that the CPNS server 10 stores therein the same information. The CPNS server 10 can also reload in real time the quantity of MSN message allowed or any other service constraint/use information into the SE of the master node for use in management of the ad-hoc network operations. If, for some reason, the CPNS server 10 cannot reload the service constraint/use information into the SE of the master node because the connection is not possible, the master node (entity #3) manages alone the ad-hoc network based on the information including the service constraint/use information stored in the SE of the master node (entity #3). As soon as the connection with the CPNS server 10 is restored, the synchronization between the CPNS server 10 and the SE in the master node (entity #3) may be performed so that the same information may be stored both in the CPNS server 10 and the SE of the ad-hoc network master node.

Accordingly, the embodiments of the present invention allow the designation of a CPNS device having a SE as an ad-hoc network master node, the configuration and management of the ad-hoc network and its operations by the designated master node using the information stored in the SE, and the communications by the master node with the CPNS server and/or an external server (e.g., network operator's server) regarding the ad-hoc network and operations, whereby enhanced ad-hoc network management and operations are provided.

The present invention has been explained with reference to the embodiments which are merely exemplary. It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A mobile terminal for controlling an ad-hoc network in a converged personal network service (CPNS) enabler, the CPNS enabler including a CPNS server and a plurality of CPNS entities, the mobile terminal being one of the CPNS entities, the mobile terminal comprising:
   a receiver/transmitter unit;
   a memory unit configured to store information which enables the mobile terminal to manage and carry out ad-hoc network operations on behalf of the CPNS server without a connection to the CPNS server, and ad-hoc network service use information dedicated to be used when the mobile terminal forms an ad-hoc network while the connection between the mobile terminal and the CPNS server is broken; and
   a processor configured to:
      receive a command to perform a configuration of an ad-hoc network, and service constraint information, from the CPNS server,
      wherein the command instructs the mobile terminal to form the ad-hoc network with one or more other CPNS entities;
      perform the configuration of the ad-hoc network according to the command, to have direct connections with each of the other CPNS entities;
      allow the mobile terminal and the other CPNS entities to communicate with each other in the ad-hoc network using the dedicated ad-hoc network service use, wherein the communication among the mobile terminal and the other CPNS entities in the ad-hoc network using the dedicated ad-hoc network service use information is allowed for a quantity of data and the dedicated ad-hoc network service use information is updated when the connection between the mobile terminal and the CPNS server is broken; and
      upload the updated ad-hoc network service use information to the CPNS server if the connection between the mobile terminal and the CPNS server is restored.

2. The mobile terminal of claim 1, wherein the processor is further configured to:
   manage and control alone the ad-hoc network using the dedicated ad-hoc network service use information until the CPNS server reloads to replace with the dedicated ad-hoc network service use information into the memory unit.

3. The mobile terminal of claim 1, wherein the service constraint information includes at least one of prepayment information and rights information for the at least one service provided in the ad-hoc network.

4. The mobile terminal of claim 1, wherein the memory unit includes at least one of a subscriber identity module (SIM) card, a secure digital (SD) card, an external card, or an internal card.

5. A mobile terminal for controlling an ad-hoc network in a converged personal network service (CPNS) enabler, the CPNS enabler including a CPNS server and a plurality of CPNS entities, the mobile terminal being one of the CPNS entities, the mobile terminal comprising:
   a receiver/transmitter unit;
   a memory unit configured to store information which enables the mobile terminal to manage and carry out ad-hoc network operations on behalf of the CPNS server without a connection to the CPNS server, and ad-hoc network service use information dedicated to be used when the mobile terminal forms an ad-hoc network while the connection between the mobile terminal and the CPNS server is broken; and
   a processor configured to:
      receive a command to perform a configuration of an ad-hoc network, and service constraint information, from the CPNS server,
      wherein the command instructs the mobile terminal to form the ad-hoc network with one or more other CPNS entities;
      perform the configuration of the ad-hoc network according to the command, to have direct connections with each of the other CPNS entities;
      allow the mobile terminal and the other CPNS entities to communicate with each other in the ad-hoc network using the dedicated ad-hoc network service use information, wherein the communication among the mobile terminal and the other CPNS entities in the ad-hoc network using the dedicated ad-hoc network service use information is allowed only during 5 minutes and the dedicated ad-hoc network service use information is updated when the connection between the mobile terminal and the CPNS server is broken; and upload the updated ad-hoc network service use information to the CPNS server if the connection between the mobile terminal and the CPNS server is restored.

6. The mobile terminal of claim 5, wherein the processor is further configured to:

manage and control alone the ad-hoc network using the dedicated ad-hoc network service use information until the CPNS server reloads to replace with the dedicated ad-hoc network service use information into the memory unit.

7. The mobile terminal of claim 5, wherein the service constraint information includes at least one of prepayment information and rights information for the at least one service provided in the ad-hoc network.

8. The mobile terminal of claim 5, wherein the memory unit includes at least one of a subscriber identity module (SIM) card, a secure digital (SD) card, an external card, or an internal card.

* * * * *